Aug. 9, 1960
R. W. KRITZER
2,948,054
METHOD OF FABRICATING FINNED HEAT TRANSFER TUBING
Filed June 14, 1956
2 Sheets-Sheet 1
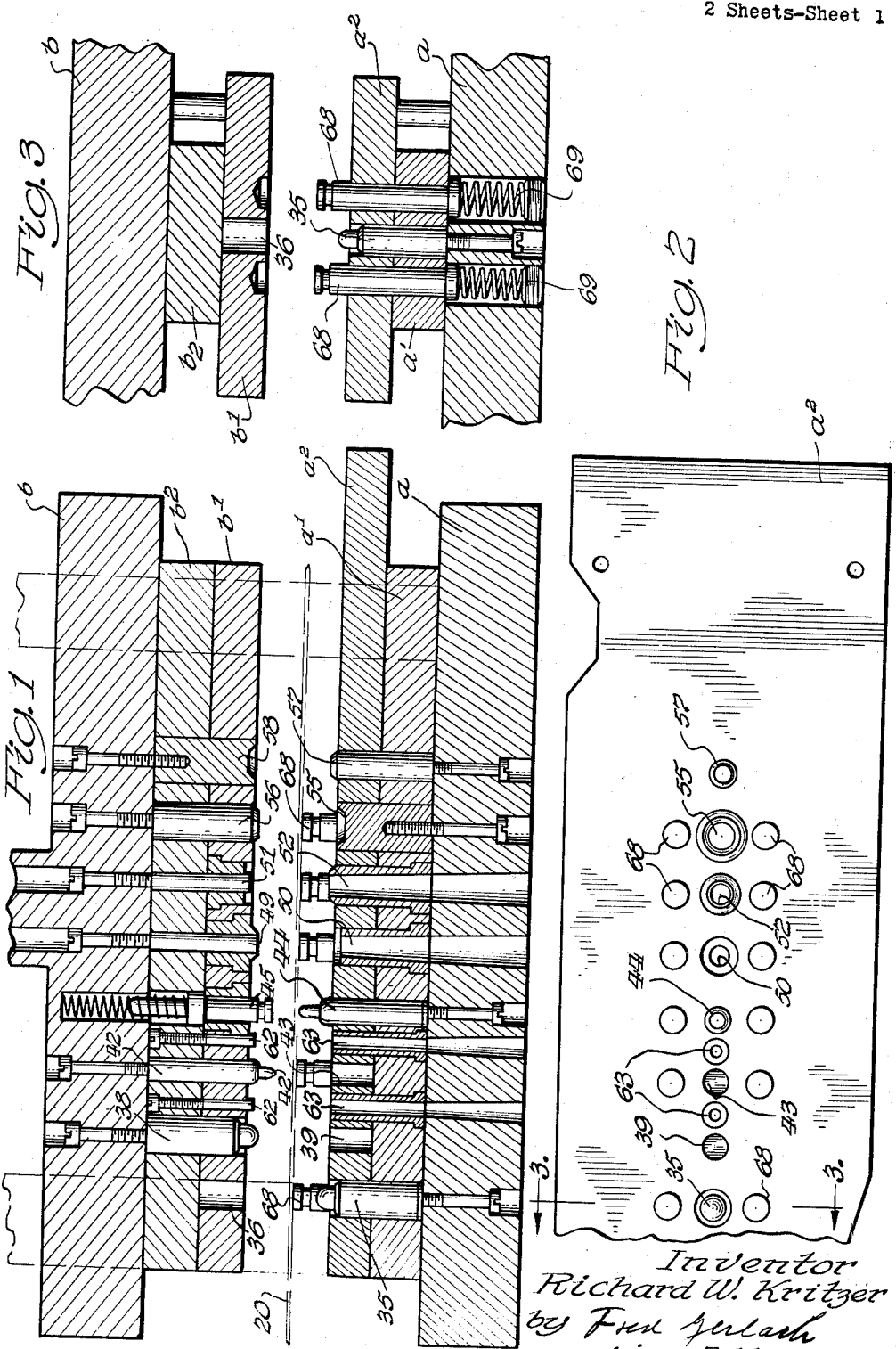
Inventor
Richard W. Kritzer
by Fred Gerlach
his Attorney Aug. 9, 1960 R. W. KRITZER 2,948,054
METHOD OF FABRICATING FINNED HEAT TRANSFER TUBING
Filed June 14, 1956 2 Sheets-Sheet 2
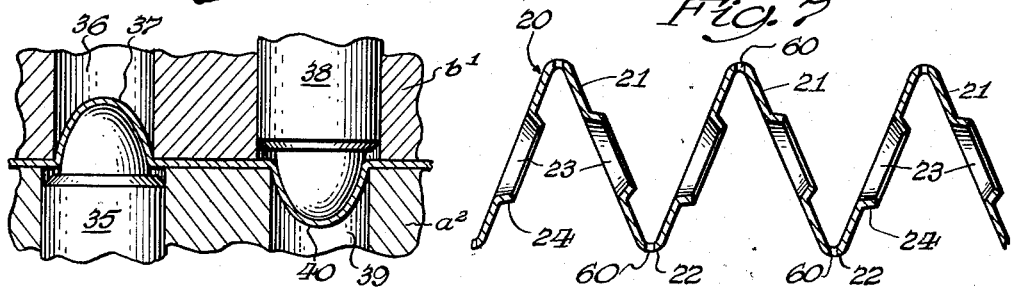
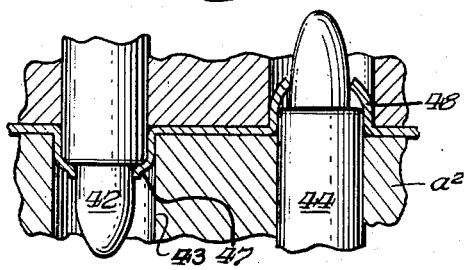
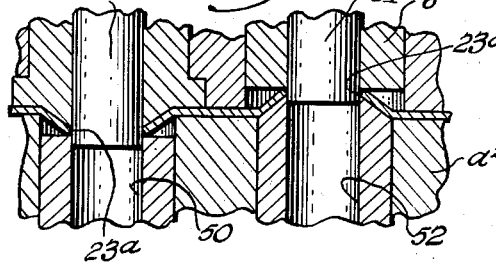
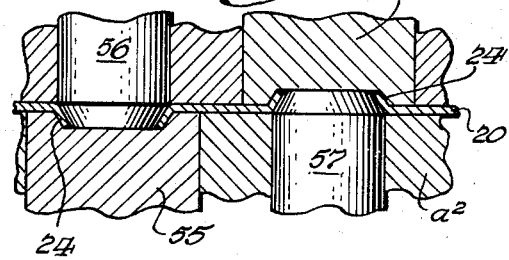
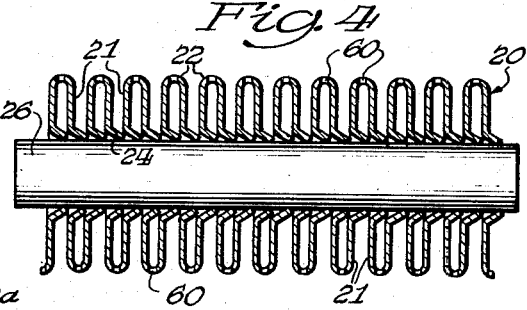
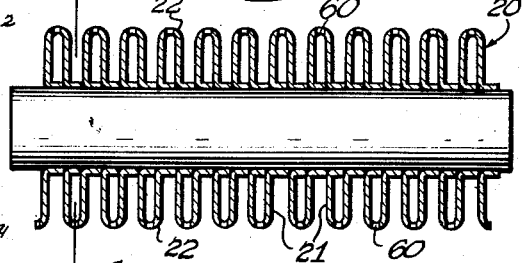
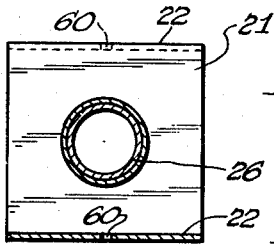
Inventor
Richard W. Kritzer
by Fred Gerlach
his Attorney United States Patent Office 2,948,054
Patented Aug. 9, 1960

2,948,054

METHOD OF FABRICATING FINNED HEAT TRANSFER TUBING

Richard W. Kritzer, % Peerless of America, 5830 N. Pulaski Road, Chicago, Ill.

Filed June 14, 1956, Ser. No. 591,492

4 Claims. (Cl. 29—157.3)

The invention relates to heat-transfer units of the type which comprises tubing provided with fins for radiating or transferring heat from fluid in the tubing to the ambient atmosphere and the fabrication of such units.

One object of the invention is to provide a unit which includes tubing and fins and can be economically fabricated.

Another object of the invention is to provide a unit of this type with high efficiency in heat transfer.

Another object of the invention is to provide an improved economical and expeditious method of fabricating heat-transfer units of this type.

Other objects will appear from the detail description.

The invention consists in the several novel features which are hereinafter set forth and are more particularly defined by claims at the conclusion hereof.

In the drawings:

Fig. 1 is a vertical longitudinal section of a press equipped with tools for forming fin-forming strips of metal with holes and surrounding annular flanges for assembly with tubing;

Fig. 2 is a plan view of the lower member of the press and the tools thereon;

Fig. 3 is a section taken on line 3—3 of Fig. 2;

Fig. 4 is a longitudinal section of a heat-transfer unit including a section of tubing and the fin-structure before the tubing has been expanded to secure the tubing and said structure in heat-conducting relation;

Fig. 5 is a similar view of the tubing and fin-structure secured together by expansion of the tubing for heat-transfer from the tubing to the fin-structure or to their operative relation;

Fig. 6 is a section taken on line 6—6 of Fig. 5;

Fig. 7 is a longitudinal section of a fin-forming strip after it has been provided with openings surrounded by annular flanges and bent on transverse lines for the insertion of the tubing through the openings;

Fig. 8 is a section illustrating the coacting tools for initially drawing or forming bulges in the continuous fin-forming strip;

Fig. 9 is a section illustrating the tools for further deforming and piercing the bulges in the strip;

Fig. 10 is a section illustrating the punching of the holes in the deformed zones for receiving the tubing; and Fig. 11 is a section illustrating the coacting dies for shaping the annular flanges around the holes preparatory to the insertion of the tubing in the fin-structure.

The invention exemplifies the formation of a fin-structure which is produced from an elongated or continuous strip 20 of metal fin-stock, which is bent to form transverse fins or members 21 which are serially joined alternately at their opposite ends 22. The strip 20 is preferably of sufficient length to provide a series of fins along the entire length of a length of tubing or tube stock 26 to which it is applied as hereinafter set forth. In the fabrication of the fin-structure a flat strip 20 of suitable metal adapted to form fins is provided; the strip while flat is deformed to provide bulges 37 and 40 spaced apart and aligned longitudinally of the strip as shown in Fig. 8; the bulges are further deformed and ruptured or pierced as shown at 47 and 48 in Fig. 9; the bulged portions are punched to form cylindrical openings 23, as shown in Fig. 10; and the metal surrounding the holes is shaped to form accurately contoured and tapered frusto-conical flanges 24, as shown in Fig. 11, which extend alternately from opposite faces of the strip and are uniformly spaced apart longitudinally of the strip. Next, the strip with the finished annular flanges is bent on transverse lines so that the strip will form an accordion-pleated structure including a series of inclined fin-forming sides 21 joined at alternately opposite ends by bends 22 with the flanges 24 on all the sides 22 extending unidirectionally and longitudinally of the strip, as illustrated in Fig. 7. The openings 23 will be generally aligned longitudinally of the bent strip and centrally disposed in the folds or sides 21. If vent openings are desired, holes 60 are punched in the portions of the strip 20 which forms bends 22. The bends 22 and sides 21 are disposed and angularly arranged as shown in Fig. 7 and permit said sides to bend into parallel spaced fin-forming relation as shown in Fig. 4 so that the axes of the flange 24 and holes 23 will be substantially coaxial. Next, a length of cylindrical tube stock 26 slightly less in diameter than the openings 23 is extended through the openings 23 and flanges 24 in the series of sides 21 to provide a connected series of transverse fins on the tubing. During this assembly of the strip and the tubing, the annular flanges 24 extend unidirectionally and are tapered away from the corresponding faces of sides 21 so that the tubing may pass endwise through the entire series of fin-forming sides 21. After this loose assembly of the strip and tubing, they are secured together in fixed and heat-transfer relation to bring the spacer flanges into contiguity and thereafter expanding the tubing into pressure contact with the series of annular flanges 24. This may be done by forcing an expander mandrel of suitable diameter longitudinally through the tubing. The tapered form of these flanges permits them to be expanded by the tubing so their inner peripheries will be parallel to the periphery of the tubing for efficient heat transfer as shown in Fig. 5. The flanges 24 when thus expanded may be of the desired length to space the sides 21 in parallel relation.

The series of steps for prefabricating the fin-structure preparatory to bending the continuous strip 20 to form a spaced succession of integral fins or transverse sides 21 may be expeditiously and economically performed in the apparatus shown in Figs. 1 to 3 and 8 to 11.

Said apparatus comprises a power operable press which includes a stationary bed a and a reciprocable head b. A series of tools in longitudinal alignment are supported on the bed a and a mating series of coacting tools are supported on and vertically movable with head b. The strip 20 is advanced longitudinally step-by-step. A series of operations are concurrently performed in consecutive order by the tools during each operation of the press. The mating tools are in longitudinal alignment to consecutively perform these operations on zones of the strip 20 for producing openings 23 in said strip for the insertion of tubing through the strip with annular flanges 24 surrounding the tubing. These flanges 24, while the strip is flat, alternately project from opposite faces of the strip so that when said strip is bent, as shown in Fig. 4, said flanges will extend unidirectionally from the fins or sides 21.

The tools of each coacting pair of punching the openings 23 in the strip 20 and forming the annular flanges 24 thereon, are mounted on the bed a and the reciprocable head $b$, respectively. The stationary tool of each mating pair is for convenience in assembly and replacement thereof supported on or in both or one of a pair of plates $a^1$ and $a^2$ which are demountably secured on the bed $a$. The other tool of each of said pairs is mounted on or in one or both of the plates $b^1$ and $b^2$ which for convenience in assembly and replacement thereof are demountably supported on the head $b$. The plates $a^1$ and $a^2$ function as a part of the stationary bed and the plates $b^1$ and $b^2$ function as a part of head $b$ during the operation of the press.

In this production of the annular flanges 24, a deforming tool 35 which is secured in plates $a^1$ and $a^2$ and on bed $a$ coacts with a socket 36 in plate $b^1$ to form an upward bulge 37 on the strip 20 and a tool 38 which is secured in plates $b^1$ and $b^2$ and on head $b$ coacts with a socket 39 in plate $a^1$ to form a downward bulge or deformation 40 on strip 20 in longitudinal alignment with bulge 37 during one operation of the press as shown in Fig. 8. The strip will next be advanced one step to position the bulges 37 between a deforming tool 42 on the head $b$ and a socket 43 in plate $a^1$ on bed $a$ and to position bulge 40 between a tool 44 in plates $a^1$ and $a^2$ on bed $a$ and a spring-pressed plunger 45 in plates $b^1$ and $b^2$ of head $b$. When the strip 20 is thus advanced and head $b$ is again operated, the bulge 37 will be deformed or stretched to provide a cylindrical base portion while at the same time the crest portion thereof will be pierced. The bulge 40 will be similarly shaped and pierced as shown in Fig. 9. The strip 20 is next advanced longitudinally to vertically align bulge 47 with a punch 49 in the plate $b^1$ and a socket 50 in plates $a^1$ and $a^2$ on bed $a$ and to vertically align bulge 48 with a punch 51 in plate $b^1$ and a socket 52 in plates $a^1$ and $a^2$ as shown in Fig. 10. When the press is again operated the punches 49 and 51 will truncate the previously deformed bulges by cutting disks therefrom and discharging them through the downwardly flared openings in sockets 50 and 52 in plates $a^1$ and $a^2$ and bed $a$, and the cylindrical base portions of the previously shaped bulges will be roughly reshaped to provide approximately frusto-conical flanges 23a surrounding the openings on opposite faces of the strip as shown in Fig. 10. The strip is next advanced to axially align one flange 23a with a female die 55 in plates $a^1$ and $a^2$ and a male die 56 in plates $b^1$ and $b^2$ and to axially align the other flange 23a with a male die 57 in plates $a^1$ and $a^2$ and a female die 58 in plates $b^1$ and $b^2$ of head $b$. During the next stroke of the press, these dies will produce uniform, accurately shaped frusto-conical flanges 23 projecting from opposite faces of strip 20 by the coacting pairs of dies 55 and 56 and 57 and 58, respectively, as shown in Fig. 11 for accurate co-relation with the tubing 26 inserted through the openings in the flanges.

In some instances, it is desirable to provide vent-holes 60 in the transverse connecting portions 22 through which air can pass from the spaces or cells between the fins or transverse portions of the finished fin-structure. These holes may be punched in the press while the strip 20 is flat and in connection with the performance of the other steps in the pre-fabrication of the strip 20, by such as a pair of punches 62 which are mounted in plates $b^1$ and $b^2$ of head $b$ and a mating pair of female dies 63 which are mounted in plates $a^1$ and $a^2$ of bed $a$. During each operation of the press, these punching dies will cut a pair of holes 60 in the strip at points suitably spaced apart and co-related to the flanges 24 so that when the strip is bent into the contour shown in Fig. 4, said holes will be disposed in the bends 22 at the opposite ends of fin-forming sides 21.

A series of plungers 68 are vertically slidable in plates $a^1$ and $a^2$ and their upper ends are adapted to support the strip 20 between the tools in position to be operated upon by the tools on the bed and the head respectively. Each plunger 68 is slidably mounted in plates $a^1$ and $a^2$ and has a shoulder 61 for limiting its upward movement by a spring 69 which is confined in bed $a$. The plungers 68 are provided at the sides of deforming tool 35, sockets 39, tool 44, dies 50 and 52 and die 55 for initially supporting the strip 20 above the tools on bed $a$. Springs 69 permit the strip 20 to be forced down to the plate $a^1$ during each depression of head $b$. Said springs also force said strip 20 after each operation away from said plate $a^1$ to release said strip for successive steps of advance for operations of the tools upon successive portions of the strip.

The invention is adapted to use very thin fin-stock having, for example, a thickness of .006 of an inch.

When the strip 20 has been fabricated with the holes 23 and surrounding die-shaped annular flanges 24, it is shaped in any suitable bending apparatus approximately to the contour shown in Fig. 7 so the strip will have transverse and alternately oppositely inclined sections for forming the fins 21, connecting portions forming the bends 22 and annular flanges 24 extending longitudinally in the same general direction around openings 23 defined by said flanges. After said bending of the strip, tubing 26 of sufficiently less diameter than holes 23 is then extended consecutively through the aligned holes in the entire strip until the strip and tubing are loosely assembled as shown in Fig. 4. The transverse members or folds are collectively compressed longitudinally and are thus forced together until they are substantially parallel to one another and at right angles to the axes of the tubing at which time the flanges will substantially correspond in length to the spaces between the fins 21. After the strip and tubing have been associated as shown in Fig. 4, the tubing is expanded, for example, by forcing a mandrel therethrough which will expand the outer periphery of the tubing a sufficient degree to cause the flanges 24 to conform to and have a friction fit with the outer periphery of the tube stock. The fin-structure will then be secured in efficient heat transfer relation with the tubing. The taper on the flanges 24 facilitates their expansion. The flanges are of suitable length to equally space the fins along the tubing when the latter has been expanded.

The individual sections of tubing and fin-structure can function as a heat transfer unit or the ends of said tubing sections in any desired number may be serially connected by curbed bends to provide a structure of greater or less desired transfer capacity. The assembled tubing and fin-structure can also be utilized in a drum-type unit by bending the tubing into spaced or circular contour because the strip secured thereon is flexible.

The invention is not to be understood as restricted to the details set forth since these may be modified within the scope of the appended claims without departing from the spirit and scope of the invention. For example, according to the present method, if desired, the use of tapered dies such as those shown at 56 and 57 in Fig. 11 may be dispensed with and the flanges 24 initially formed to approximately cylindrical shape prior to the bending and collapsing operations.

Having thus described the invention what I claim as new and desire to secure by Letters Patent is:

1. The method of fabricating finned heat transfer tubing from flat sheet metal fin stock and cylindrical tube stock which comprises: creating in the fin stock a longitudinally extending row of equally spaced cup-shaped bulges which project out of the plane of the fin stock alternately in opposite directions, piercing the apices of said bulges to provide apertures therethrough, while simultaneously shaping the bases of the bulges to substantially cylindrical form, removing the metal of the pierced apices of the bulges so as to provide in the flat sheet metal fin stock a longitudinally extending row of equally spaced circular tube openings surrounded by annular truly continuous spacer flanges which project out of the plane of the fin stock alternately in opposite directions, bending the thus formed fin stock transversely midway between adjacent tube openings alternately in opposite directions to bring the spacer flanges into axial alignment and substantial contiguity, with said spacer flanges extending unidirectionally from the rims of the various openings, and thereby providing an accordion-pleated structure having substantially parallel folds, inserting a length of cylindrical tube stock of a diameter less than the diameter of said tube openings and their surrounding spacer flanges, and, thereafter, uniformly expanding said tube stock radially within the tube openings into intimate face-to-face frictional contact with the inside surfaces of said annular spacer flanges.

2. The method of fabricating finned heat transfer tubing from flat sheet metal fin stock and cylindrical tube stock which comprises: first creating in the fin stock a longitudinally extending row of equally spaced bulges which project out of the plane of the fin stock alternately in opposite directions, then piercing the apices of said bulges to provide apertures therethrough, while simultaneously shaping the bases of the bulges to substantially cylindrical form, then removing the metal of the pierced apices of the bulges so as to provide in the flat sheet metal fin stock a longitudinally extending row of equally spaced circular tube openings surrounded by annular truly continuous spacer flanges which project out of the plane of the fin stock alternately in opposite directions, then shaping said spacer flanges to accurate frusto-conical configuration, then bending the thus formed fin stock transversely midway between adjacent tube openings alternately in opposite directions to bring the spacer flanges into axial alignment and substantial contiguity, with the frusto-conical spacer flanges extending unidirectionally from the rims of the various openings, and thereby providing an accordion-pleated structure having substantially parallel folds, then inserting a length of cylindrical tube stock of a diameter less than the diameter of said tube openings through the tube openings and their surrounding frusto-conical spacer flanges, and finally uniformly expanding said tube stock radially within the tube openings into intimate face-to-face frictional contact with the inside surfaces of the frusto-conical spacer flanges to, in turn, expand the latter to substantially cylindrical form.

3. The method of fabricating finned heat transfer tubing from flat sheet metal stock and cylindrical tube stock which comprises: creating in the fin stock a longitudinally extending row of equally spaced bulges which project out of the plane of the fin stock alternately in opposite directions, truncating the apex regions of said bulges so as to provide in the flat sheet metal fin stock a longitudinally extending row of equally spaced circular tube openings surrounded by annular truly continuous spacer flanges which project out of the plane of the fin stock alternately in opposite directions, shaping said spacer flanges so as to embody a frusto-conical configuration, bending the thus formed fin stock transversely midway between adjacent tube openings alternately in opposite directions to bring the spacer flanges into axial alignment and substantial contiguity, with said spacer flanges extending unidirectionally from the rims of the various tube openings, and thereby providing an accordion-pleated structure having substantially parallel folds, inserting a length of cylindrical tube stock of a diameter less than the diameter of said tube openings through the tube openings and their surrounding spacer flanges, and, thereafter, uniformly expanding said tube stock radially within the tube openings into intimate face-to-face frictional contact with the inside surfaces of said spacer flanges.

4. The method of fabricating finned heat transfer tubing from flat sheet metal stock and cylindrical tube stock which comprises: creating in the fin stock a longitudinally extending row of equidistantly spaced bulges which project out of the plane of the fin stock alternately in opposite directions, removing the apex regions of said bulges and shaping to substantially cylindrical form the base regions of said bulges so as to provide in the flat sheet metal fin stock a longitudinally extending row of equidistantly spaced tube openings surrounded by annular truly continuous spacer flanges which project out of the plane of the fin stock alternately in opposite directions, shaping said spacer flanges so as to embody a frusto-conical configuration, bending the thus formed fin stock transversely midway between adjacent openings alternately in opposite directions to bring the spacer flanges into axial alignment and substantial contiguity, with such spacer flanges extending unidirectionally from the rims of the various tube openings, and thereby providing an accordion-pleated structure having substantial parallel folds, inserting a length of cylindrical tube stock of a diameter less than the diameter of said tube openings through the tube openings and their surrounding spacer flanges, and thereafter uniformly expanding said tube stock radially within the tube openings into intimate face-to-face frictional contact with the inside surfaces of said spacer flanges.

References Cited in the file of this patent

UNITED STATES PATENTS

| Number | Name | Date |
|---|---|---|
| 785,081 | Brinkman | Mar. 21, 1905 |
| 1,787,942 | Kalloch | Jan. 6, 1931 |
| 1,984,938 | Mason et al. | Dec. 18, 1934 |
| 1,990,718 | Swanstrom | Feb. 12, 1935 |
| 2,063,736 | Hardiman | Dec. 8, 1936 |
| 2,246,258 | Lehman | June 17, 1941 |
| 2,252,209 | Schank et al. | Aug. 12, 1941 |
| 2,307,355 | Bredeson | Jan. 5, 1943 |
| 2,373,901 | Lowery | Apr. 17, 1945 |

FOREIGN PATENTS

| Number | Country | Date |
|---|---|---|
| 46,174 | Sweden | Nov. 12, 1917 |
| 326,310 | Germany | Sept. 27, 1920 |
| 826,416 | France | Mar. 3, 1938 |